United States Patent [19]

Kinugasa et al.

[11] Patent Number: 5,410,199
[45] Date of Patent: Apr. 25, 1995

[54] VERTICALLY CARRYING SUPERCONDUCTION MOTOR

[75] Inventors: Manabu Kinugasa; Tomoyuki Mizushina; Hiroyuki Aoki, all of Tokyo; Toshihide Nakano, Kobe; Takuya Kimura, Kobe; Kazuyoshi Hayakawa, Kobe; Kenichi Matsunaga, Tokyo, all of Japan

[73] Assignees: Doryokuro Kakunenryo Kaihatsu Jigyodan; Mitsubishi Heavy Industries, Ltd., both of Tokyo, Japan

[21] Appl. No.: 603,116

[22] Filed: Oct. 25, 1990

[30] Foreign Application Priority Data

Oct. 26, 1989 [JP] Japan .................. 1-277143

[51] Int. Cl.$^6$ .................................................. B66B 1/06
[52] U.S. Cl. ................................ 310/12; 187/250; 318/135; 505/903
[58] Field of Search .................. 310/12, 13, 15, 17, 310/27, 36, 38; 505/902, 903, 904, 905, 906, 907, 908, 700; 187/112; 318/135

[56] References Cited

U.S. PATENT DOCUMENTS

| | | | |
|---|---|---|---|
| 259,817 | 6/1882 | Cheever | 310/14 |
| 425,038 | 4/1890 | Maynadier | 310/14 |
| 751,857 | 2/1904 | Krause | 310/14 |
| 1,020,943 | 3/1912 | Bachelet | 310/13 |
| 3,185,909 | 5/1965 | Jahn | 318/135 |
| 3,513,338 | 5/1970 | Poloujadoff | 104/148 LM |
| 3,589,300 | 6/1971 | Wipf | 104/148 MS |
| 3,842,751 | 10/1974 | Thornton et al. | 104/148.55 |
| 3,927,735 | 12/1975 | Miericke et al. | 104/148 MS |
| 4,015,540 | 4/1977 | Roxberry | 104/148 LM |
| 4,126,798 | 11/1978 | Carr, Jr. et al. | 310/204 |
| 4,460,855 | 7/1984 | Kelly | 318/135 |
| 4,555,650 | 11/1985 | Asakawa | 318/135 |
| 4,570,753 | 2/1986 | Ohta et al. | 187/1 R |
| 4,913,030 | 4/1990 | Reynolds | 89/8 |
| 4,922,800 | 5/1990 | Hoffman | 89/8 |
| 4,960,760 | 10/1990 | Wang et al. | 505/1 |
| 5,017,549 | 5/1991 | Robertson | 505/1 |
| 5,141,082 | 8/1992 | Ishii et al. | 187/110 |
| 5,183,980 | 2/1993 | Okuma et al. | 187/112 |

OTHER PUBLICATIONS

Schwartz et al, "Superconducting Machines and Devices Large Systems Applications", 1974, Chapter 6, pp. 352, 354, 355.

*Primary Examiner*—Steven L. Stephan
*Assistant Examiner*—D. R. Haszko
*Attorney, Agent, or Firm*—Nikaido, Marmelstein, Murray & Oram

[57] ABSTRACT

A vertically carrying apparatus comprising a carrying capsule that has a space for accommodating an object which is to be carried, the capsule incorporating a horizontal superconducting coil, and armature coils that are vertically arranged side by side outside the carrying capsule, wherein upward thrust force is obtained by a correlation between a persistent current that flows in the superconducting coil and magnetic fields that are produced around the armature coils.

The vertically carrying apparatus further comprises a coil support device which includes the superconducting coil, a coil support member that supports the superconducting coil, a helium vessel that accommodates the superconducting coil and the coil support member and that also supports the coil support member through an oscillation preventing member, and a vacuum vessel that accommodates and supports the helium vessel.

3 Claims, 10 Drawing Sheets

VERTICALLY CARRYING SUPERCONDUCTION MOTOR

BACKGROUND OF THE INVENTION

The present invention relates to a vertically carrying apparatus that carries an object vertically by use of a superconducting coil and armature coils.

In conventional vertically carrying apparatuses, for example, elevators, lifting devices, etc., an object is carried vertically by winding or unwinding a wire (or chain) by means of a rotational prime mover, for example, an electric motor.

Since the conventional vertically carrying apparatuses are designed to carry an object vertically by winding or unwinding a wire (or chain) by means of a rotational prime mover, e.g., an electric motor, as described above, when vertical conveyance for a long distance is to be effected, the wire lengthens, so that the wire's own weight that acts on the wire as a load may exceed the tensile strength of the wire. In such a case, it becomes impossible to perform vertical conveyance. If the cross-sectional area of the wire is enlarged in order to increase the tensile strength, the wire's own weight increases by an amount corresponding to an increase in the cross-sectional area of the wire, so that it also becomes impossible to effect vertical conveyance. Thus, in this type of vertically carrying apparatus, the distance for which an object can be carried vertically is limited by the wire's (or chain's) own weight.

If a superconducting coil and armature coils are used, it is possible to carry an object vertically without using a wire or chain. However, the conventional apparatuses of this type are adapted for horizontal conveyance, and if such an apparatus is applied to vertical conveyance, problems which will be stated below arise. One example of the conventional horizontally carrying apparatuses that carry an object horizontally by use of a combination of superconducting and armature coils will first be explained with reference to FIG. 13. A vacuum vessel 04 is attached to a carrying capsule (not shown). A helium container 012 is accommodated and secured in the vacuum vessel 04. A superconducting coil 03 is accommodated and secured in the helium vessel 012. Reference numeral 014 denotes bands that are used to secure the vacuum vessel 04 to the carrying capsule. In operation, the current value of each of the armature coils (not shown) that are horizontally arranged side by side outside the carrying capsule is controlled in accordance with the movement of the carrying capsule so that magnetic fields B that are produced around the armature coils intersect vertically to a persistent current I that flows in the superconducting coil 03, thereby obtaining horizontal thrust force F at the portions A and C of the superconducting coil 03 and further obtaining carrying capsule levitating force at the portion B. If this horizontally carrying apparatus is applied to vertical conveyance, the arrangement may be such as that shown in FIG. 14. In this figure, reference numeral 01 denotes a carrying capsule that accommodates an object to be carried. A vacuum vessel 04 is secured to the carrying capsule 01 through bands 014, and a helium vessel 012 is accommodated and secured in the vacuum vessel 04. In addition, a superconducting coil 03 is accommodated and secured in the helium vessel 012. The vacuum vessel 04, the helium vessel 012 and the superconducting coil 03 are directed vertically, and armature coils are vertically arranged side by side, surrounding the carrying capsule 01. In this case, upward thrust force F is obtained at the portions A and C of the superconducting coil 03, shown in FIG. 13, but no upward thrust force F is obtained at the portion B. Therefore, it has heretofore been necessary in order to obtain large upward thrust force F to increase the overall size of the vertically carrying apparatus, resulting in a rise in the construction cost.

SUMMARY OF THE INVENTION

In view of the above-described problems of the prior art, it is an object of the present invention to provide a vertically carrying apparatus which is designed so that it is possible to reduce the construction cost and also protect the superconducting coil and the helium vessel from oscillation and thermal contraction.

To this end, the present invention provides a vertically carrying apparatus comprising a carrying capsule that has a space for accommodating an object which is to be carried, the capsule incorporating a horizontal superconducting coil, and armature coils that are vertically arranged side by side outside the carrying capsule, wherein upward thrust force is obtained by a correlation between a persistent current that flows in the superconducting coil and magnetic fields that are produced around the armature coils.

The vertically carrying apparatus of the present invention further comprises a coil support device which includes the superconducting coil, a coil support member that supports the superconducting coil, a helium vessel that accommodates the superconducting coil and the coil support member and that also supports the coil support member through an oscillation preventing member, and a vacuum vessel that accommodates and supports the helium vessel.

In the vertically carrying apparatus of the present invention, arranged as described above, the carrying capsule is raised inside the armature coils that are vertically arranged side by side, with an object to be carried being accommodated within the space that is defined in the carrying capsule. At that time, the current value of each armature coil is controlled in accordance with the movement of the carrying capsule so that magnetic fields B that are produced around the armature coils intersect vertically to a persistent current I that flows in the superconducting coil that is horizontally attached to the carrying capsule, thereby allowing all of the persistent current I flowing in the superconducting coil to contribute to the upward thrust force F, and thus enabling maximal upward thrust force F to be obtained.

The vertically carrying apparatus of the present invention further comprises a coil support device which includes a coil support member that supports the superconducting coil, a helium vessel that accommodates the superconducting coil and the coil support member and that also supports the coil support member through an oscillation preventing member, and a vacuum vessel that accommodates and supports the helium vessel, thereby protecting the superconducting coil and the helium vessel from oscillation and thermal contraction.

DETAILED DESCRIPTION OF THE PREFERRED EMBODIMENTS

Figure 1:
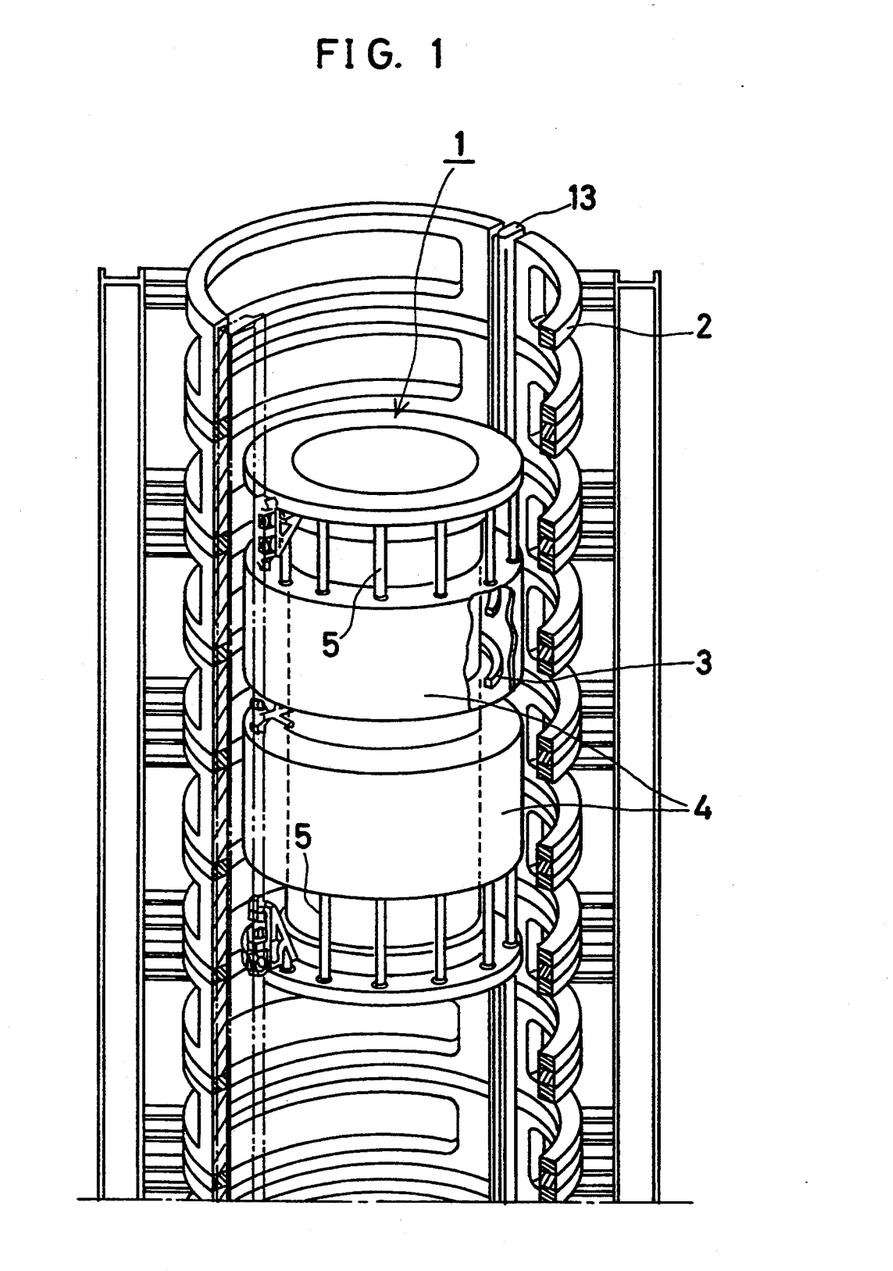
FIG. 1 is a perspective view of one embodiment of the vertically carrying apparatus according to the present invention.
Figure 2:
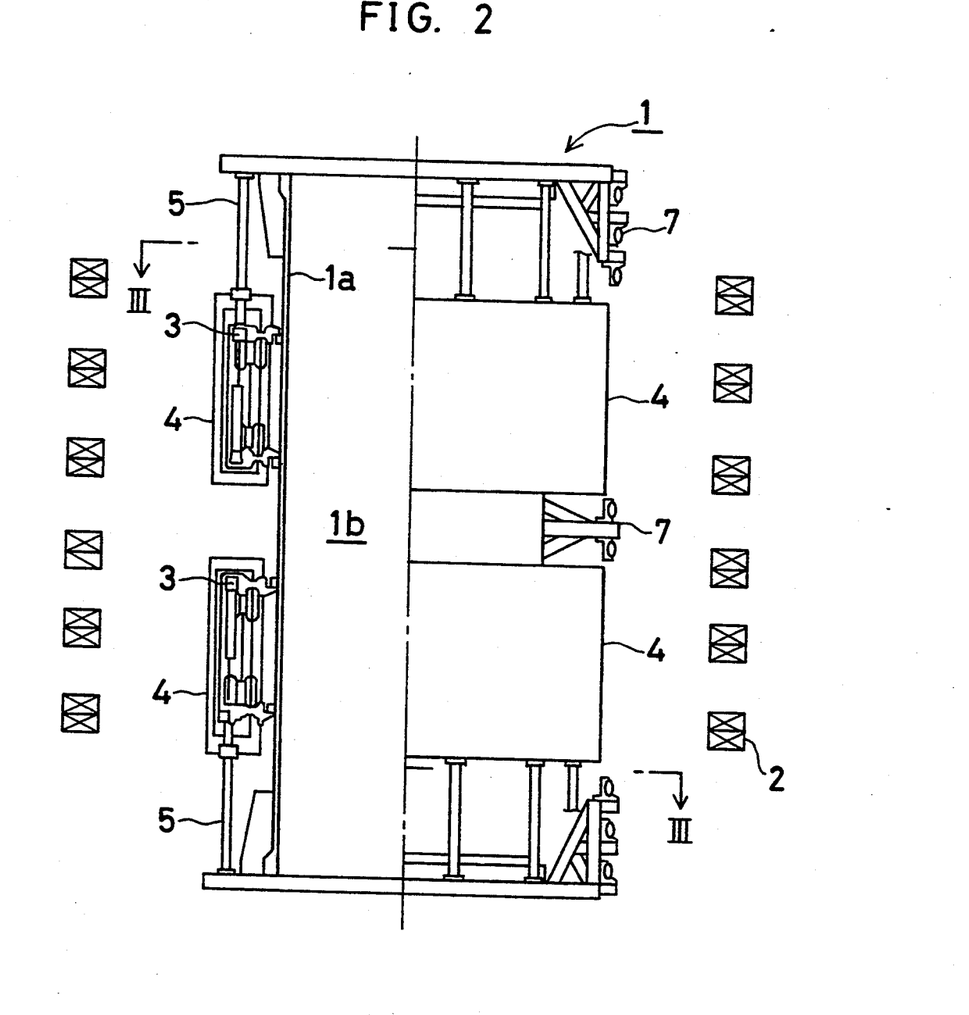
FIG. 2 is a partly-sectioned side view of the embodiment.
Figure 3:
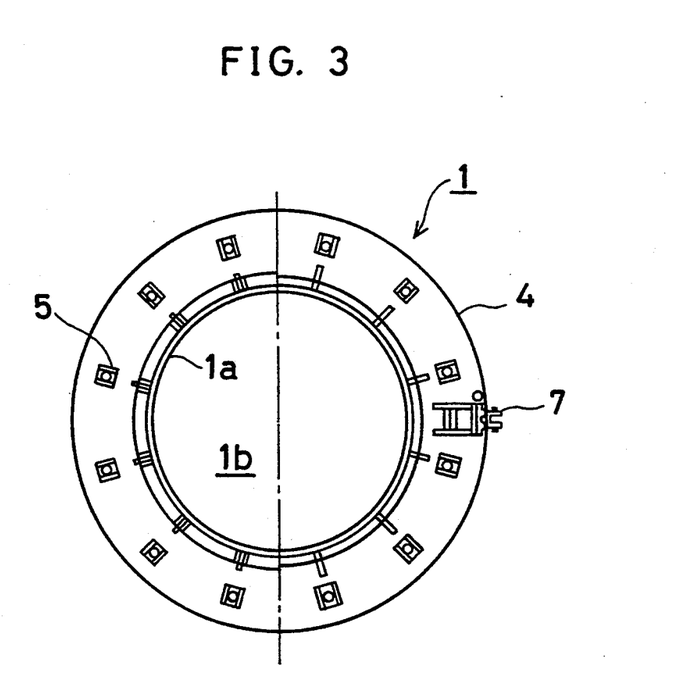
FIG. 3 is a sectional plan view taken along the line III—III of FIG. 2.
Figure 4:
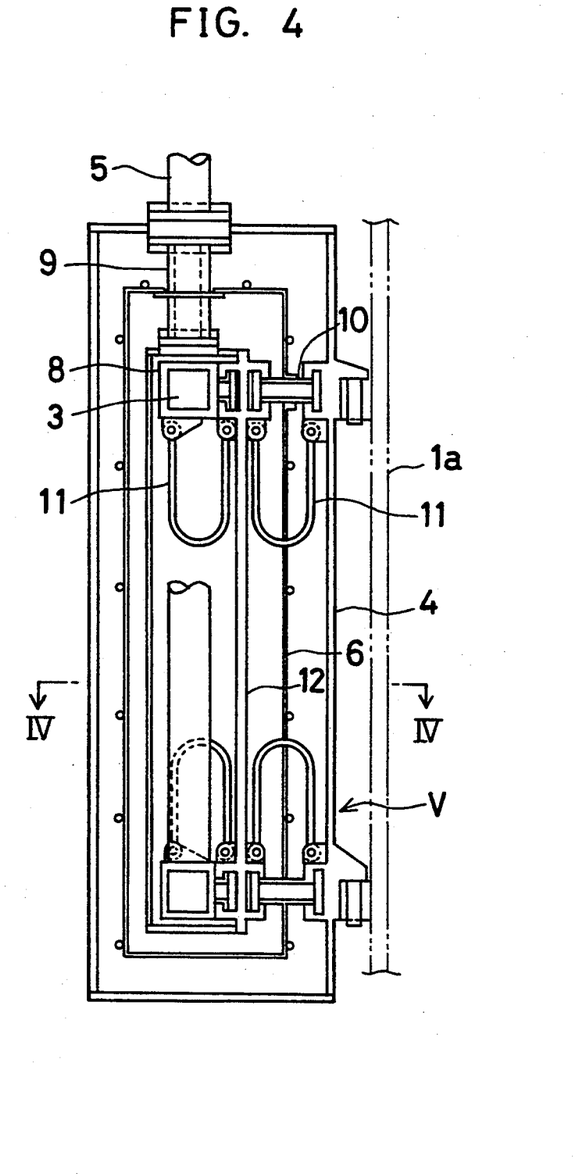
FIG. 4 is a a sectional side view showing a part of the embodiment that includes a vacuum vessel, a helium vessel and a superconducting coil.
Figure 7:
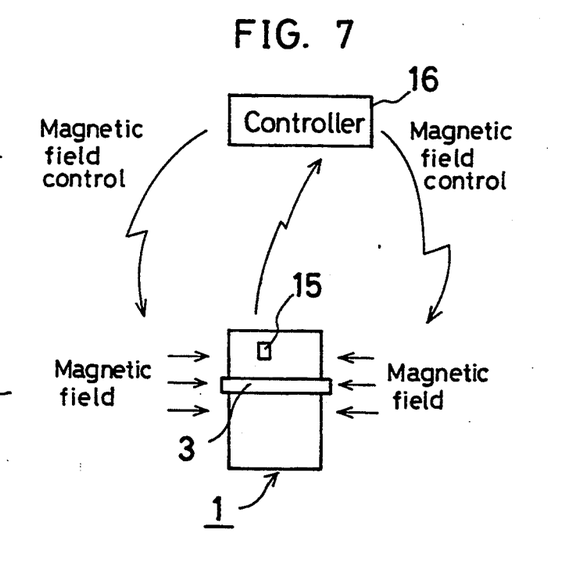
FIG. 7 shows one example of a device for controlling the position of the carrying capsule.

One embodiment of the vertically carrying apparatus according to the present invention will be described below with reference to FIGS. 1 to 6. Reference numeral 1 in FIGS. 1, 2 and 3 denotes a carrying capsule, which comprises a hollow capsule body 1a. A space 1b for accommodating an object to be carried is defined in the hollow capsule body 1a, as shown in FIGS. 2 and 3. Armature coils 2 are vertically arranged side by side outside the carrying capsule 1, the coils 2 being secured inside a pit. Annular vacuum vessels 4 are secured to the hollow capsule body 1a of the carrying capsule 1 through a plurality of vacuum vessel support members 5. A heat shield plate 6 is accommodated and secured in each vacuum vessel 4, as shown in FIG. 4. A helium vessel 12 is accommodated and secured in a space that is defined by the heat shield plate 6. A brake unit 7 is attached to the carrying capsule 1, as shown in FIGS. 2 and 3. The brake unit 7 has a disc pad (not shown) that is provided in opposing relation to a guide rail 13 that also serves as a disc shoe, which is shown in FIG. 1. A superconducting coil 3 is accommodated and secured in each helium vessel 12, as shown in FIGS. 1 to 6. Thus, the superconducting coil 3, which is accommodated double in the helium vessel 12 and the vacuum vessel 4, is maintained in cryogenic conditions. The superconducting coil 3 is supported by a coil support member 8. Reference numeral 9 denotes an axial support member 9 for the helium vessel 12, and 10 a radial support member for both the superconducting coil 3 and the helium vessel 12. Reference numeral 11 denotes U-shaped oscillation preventing members. More specifically, the heat shield plate 6 is supported by the axial support member 9 and the radial support member 10, and the superconducting coil 3 is supported by the coil support member 8 in such a manner that the coil 3 is slidable circumferentially. In addition, one end portion of one U-shaped oscillation preventing member 11 is secured to the coil support member 8, and the other end portion of the oscillation preventing member 11 is secured to the helium vessel 12. Thus, the coil support member 8 is not secured directly to the helium vessel 12. More specifically, a radial gap ($\delta_1$) is provided between the coil support member 8 and the helium vessel 12 by taking into account thermal contraction. Similarly, one end portion of another U-shaped oscillation preventing member 11 is secured to the helium vessel 12, and the other end portion of the oscillation preventing member 11 is secured to the vacuum vessel 4. Thus, the two end portions of the radial support member 10 are not secured directly to the helium vessel 12 and the vacuum vessel 4. More specifically, a radial gap ($\delta_2$) is provided between one end portion of the radial support member 10 and the helium vessel 12 by taking into account thermal contraction, and an axial gap ($\delta_3$) is similarly provided between the other end portion of the radial support member 10 and the vacuum vessel 4 by taking into account thermal contraction. In the case where the guide rail 13 that also serves as a disc shoe is provided on the armature coil side, as described above, it is unnecessary to adjust the angle of inclination of the carrying capsule 1 (i.e., the superconducting coil 3). However, when no guide rail 13 is provided, the angle of inclination of the carrying capsule 1 (i.e., the superconducting coil 3) is controlled, as shown in FIG. 7. More specifically, an inclination sensor 15 is attached to the carrying capsule 1, as shown in FIG. 7, and an inclination angle signal is sent to the inclination sensor 15 by wireless from a controller 16 that is installed on the ground, thereby controlling magnetic fields so as to adjust the angle of inclination of the carrying capsule 1 (i.e., the superconducting coil 3). In actual practice, two inclination sensors 15 for two directions X (I) and Y (B) are attached to the carrying capsule 1, and these inclination sensors 15 are controlled by the respective controllers 16.

Figure 8:
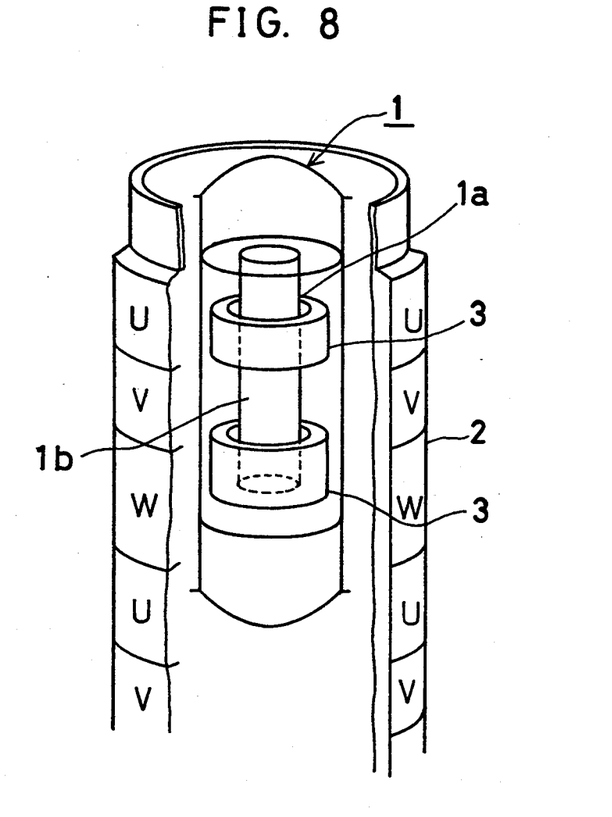
FIG. 8 is a perspective view showing the way in which the carrying capsule is moved.
Figure 9:
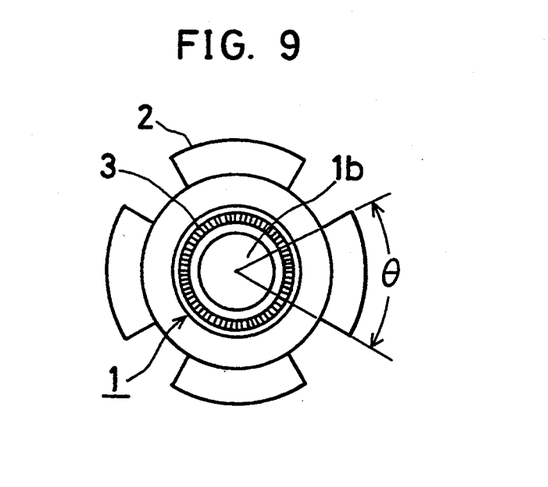
FIG. 9 is a plan view of the arrangement that is shown in FIG. 8.
Figure 10:
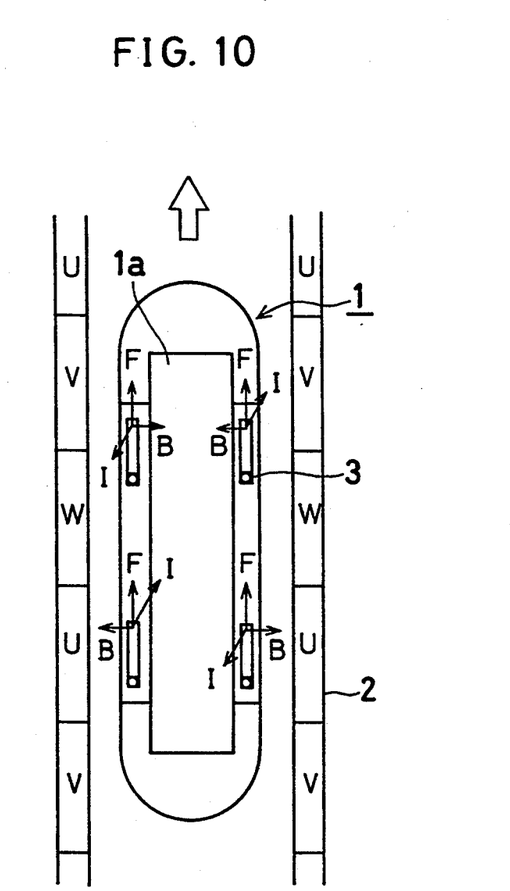
FIGS. 10, 11 and 12 show the correlation between a persistent current that flows in each superconducting coil, magnetic fields that are produced around armature coils, and upward thrust force that acts on the carrying capsule.
Figure 11:
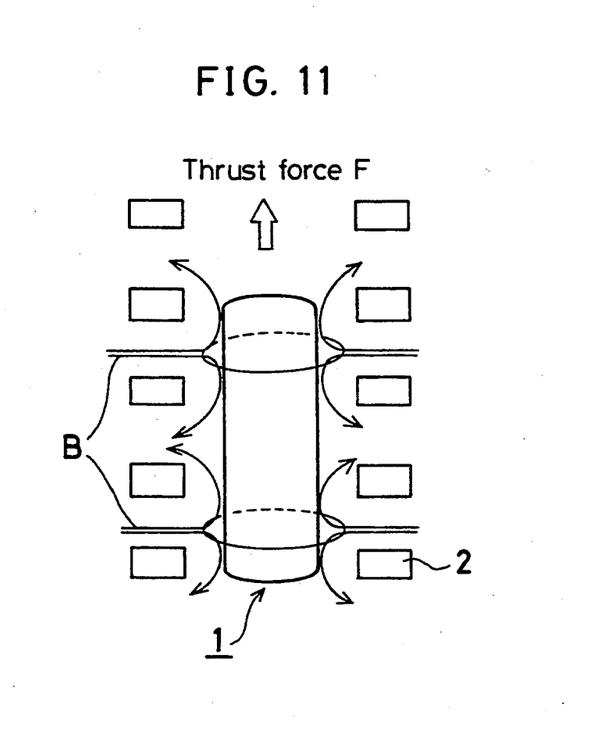
Figure 12:
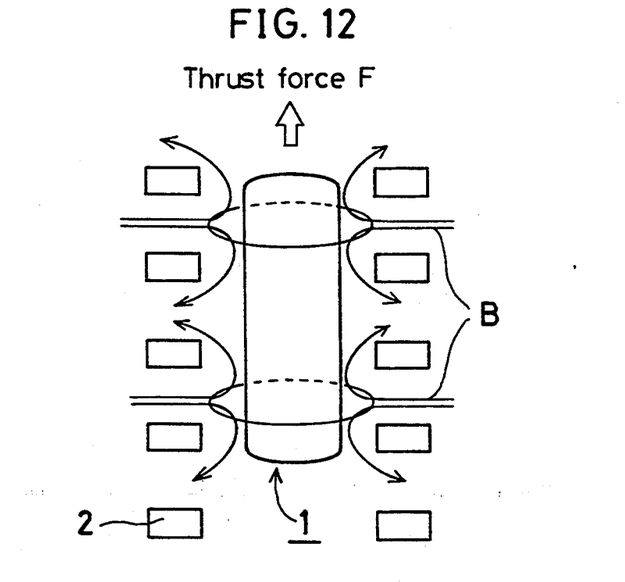
Figure 13:
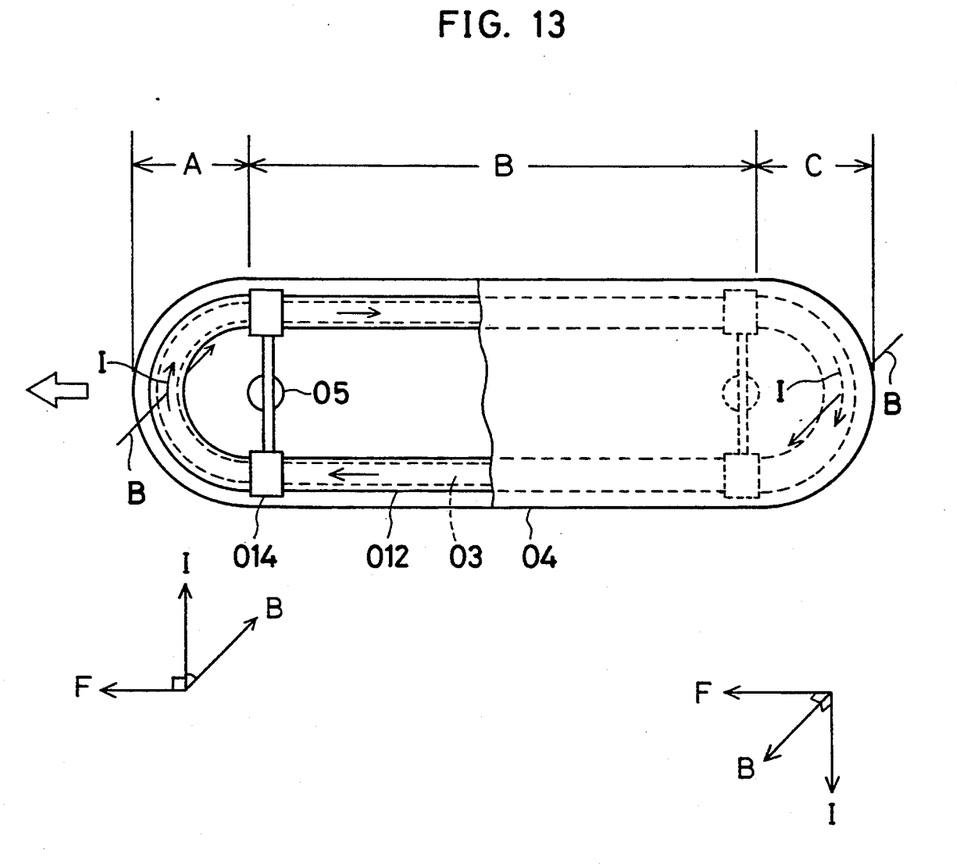
FIG. 13 shows the operation of a conventional horizontally carrying apparatus.
Figure 14:
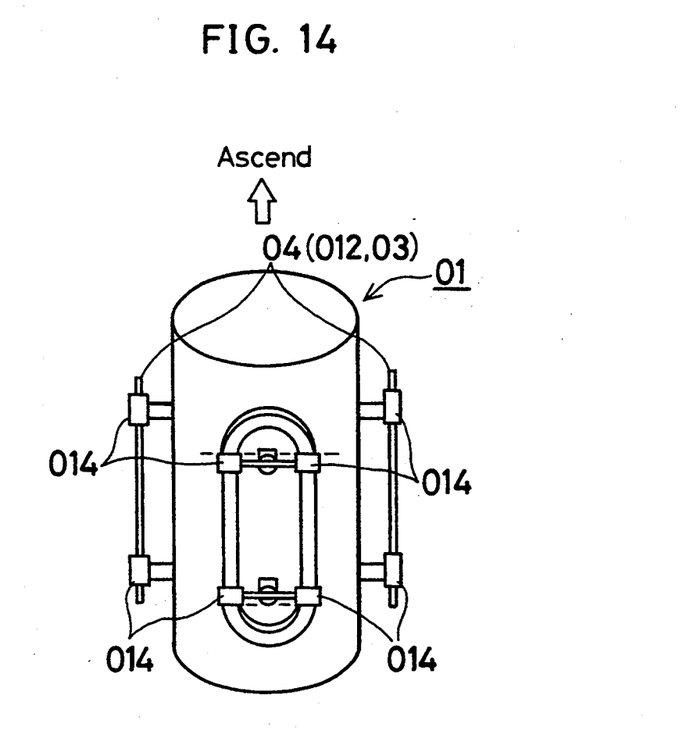
FIG. 14 is a perspective view of an arrangement in which the conventional horizontally carrying apparatus is applied to a vertically carrying apparatus.

The operation of the vertically carrying apparatus, which is shown in FIGS. 1 to 6, will next be explained specifically with reference to FIGS. 8 to 12. With an object to be carried being accommodated within the space 1b that is defined in the carrying capsule 1, the capsule 1 is raised inside the armature coils 2 that are vertically arranged side by side, as shown in FIGS. 8 and 9. At that time, as shown in FIGS. 10, 11 and 12, the current value of each armature coil 2 is controlled in accordance with the movement of the carrying capsule 1 so that magnetic fields B that are produced around the armature coils 2 intersect vertically to a persistent current I that flows in each superconducting coil 3 that is horizontally attached to the carrying capsule 1, thereby allowing all of the persistent current I flowing in the superconducting coil 3 to contribute to the upward thrust force F, and thus enabling maximal upward thrust force F to be obtained at the carrying capsule 1. More specifically, if the conventional horizontally carrying apparatus that is shown in FIG. 13 is applied to vertical conveyance, the superconducting coil 03 is directed vertically, as shown in FIG. 14. In this case, upward thrust force F is obtained at the portions A and C, shown in FIG. 13, but no upward thrust force F is obtained at the portion B. Therefore, it has heretofore been necessary in order to obtain large upward thrust force F to increase the overall size of the vertically carrying apparatus, resulting in a rise in the construction cost. In the vertically carrying apparatus of the present invention, however, each superconducting coil 3 is horizontally attached to the carrying capsule 1 and all of the persistent current I that flows in the superconducting coil 3 is allowed to contribute to the upward thrust force F, so that it is possible to obtain maximal upward thrust force F at the carrying capsule 1.

Figure 5:
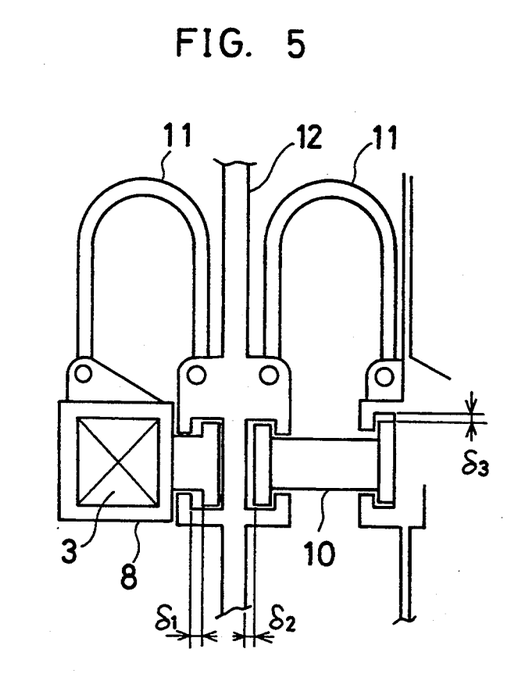
FIG. 5 is an enlarged side view of the part that is indicated by the arrow V in FIG. 4.
Figure 6:
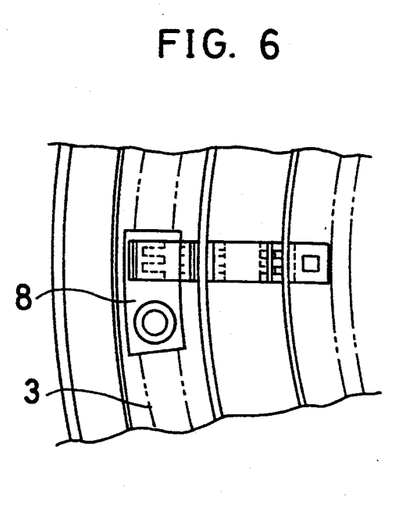
FIG. 6 is a sectional plan view taken along the line VI—VI of FIG. 4.

In addition, the superconducting coil 3 is supported by the coil support member 8 in such a manner that the coil 3 is slidable circumferentially, and one end portion of the first U-shaped oscillation preventing member 11 is secured to the coil support member 8, while the other end portion of the oscillation preventing member 11 is secured to the helium vessel 12, thereby providing the radial gap ($\delta_1$) between the coil support member 8 and the helium vessel 12 for absorbing thermal contraction. Similarly, one end portion of the second U-shaped oscillation preventing member 11 is secured to the helium vessel 12, while the other end portion of the oscillation preventing member 11 is secured to the vacuum vessel 4, thereby providing the radial gap ($\delta_2$) between one end portion of the radial support member 10 and the helium vessel 12 for absorbing thermal contraction and also providing the axial gap ($\delta_3$) between the other end portion of the radial support member 10 and the vacuum vessel 4 for absorbing thermal contraction. Thus, the superconducting coil 3 and the helium vessel 12 are protected from oscillation and thermal contraction.

In the vertically carrying apparatus of the present invention, the carrying capsule is raised inside the armature coils that are vertically arranged side by side, with an object to be carried being accommodated within the space that is defined in the carrying capsule. At that time, the current value of each armature coil is controlled in accordance with the movement of the carrying capsule so that the magnetic fields B that are produced around the armature coils intersect vertically to the persistent current I that flows in each superconducting coil that is horizontally attached to the carrying capsule, thereby allowing all of the persistent current I flowing in the superconducting coil to contribute to the upward thrust force F, and thus enabling maximal upward thrust force F to be obtained at the carrying capsule without the need to increase the overall size of the vertically carrying apparatus. The construction cost can therefore be reduced.

The vertically carrying apparatus of the present invention further comprises a coil support device which includes the coil support member that supports a superconducting coil, the helium vessel that accommodates the superconducting coil and the coil support member and that also supports the coil support member through an oscillation preventing member, and the vacuum vessel that accommodates and supports the helium vessel, so that it is possible to protect the superconducting coil and the helium container from oscillation and thermal contraction.

What is claimed is:

1. A vertically carrying apparatus comprising a carrying capsule that has a space for accommodating an object which is to be carried, said capsule incorporating a horizontal superconducting coil, and armature coils that are vertically arranged side by side outside said carrying capsule and lying in the horizontal plane in each area of said superconducting coil, said armature coils being coiled in such a manner as to generate a magnetic field in parallel to said superconducting coil, composed of a plurality of coils in which current flows in an amount which is controlled to correspond to the position of each of said coils, wherein vertical thrust force is obtained by interaction between the current flowing in said superconducting coil and the magnetic field generated around said armature coils.

2. A vertically carrying apparatus according to claim 1, further comprising a coil support device which includes a coil support member that supports said superconducting coil, a helium vessel that accommodates said superconducting coil and said coil support member and that also supports said coil support member through an oscillation preventing member, and a vacuum vessel that accommodates and supports said helium vessel.

3. A vertically carrying apparatus as set forth in claim 1, wherein said armature coils are vertically arranged side by side such that at least two coils are equidistantly spaced around the peripheral surface of the capsule, whereby magnetic fields produced around said armature coils intersect vertically to form a persistent current that flows in each superconducting coil, forming said vertical thrust force.

* * * * *